Jan. 2, 1951
J. ROJAKOVICK
2,536,311
WINDSHIELD SCRAPER
Filed Aug. 4, 1947
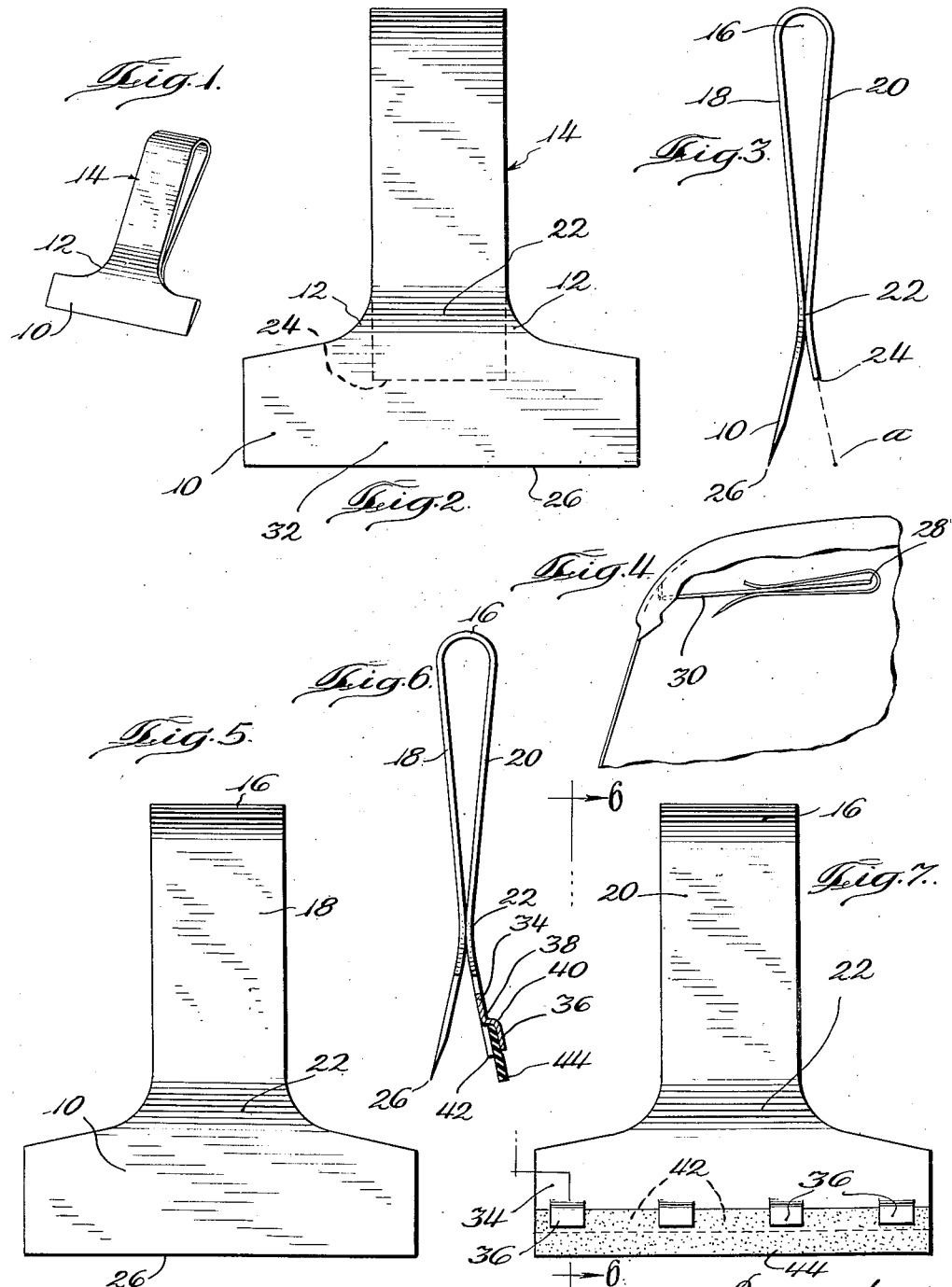
Inventor
Joseph Rojakovick
By Hinkle, Horton, Ahlberg, Housmann & Kupper
Attorneys Patented Jan. 2, 1951

2,536,311

UNITED STATES PATENT OFFICE 2,536,311

WINDSHIELD SCRAPER

Joseph Rojakovick, Chicago, Ill., assignor to Brown & Bigelow, St. Paul, Minn., a corporation of Minnesota Application August 4, 1947, Serial No. 765,859

1 Claim. (Cl. 15—236)

My invention relates to an improved windshield scraper which can be clasped to an automobile sun visor or other projection so as to be readily available for use.

An important object of the invention is to provide a windshield scraper having a sharp edge to scrape off snow or ice, in which the handle may also perform the function of a clasp whereby the device may be easily attached to a sun visor or other structure where it is in plain view of the operator, and from which it may be easily removed for use and easily replaced so as to be readily available for further use.

Another object of the invention is to provide a windshield scraper which may be manufactured at very low cost, and which provides a space for an advertiser's name or slogan, and which therefore can be given away as an advertising novelty with little expense.

A second form of the invention carries out the objects already described, and also provides a wiper or squeegee whereby water and dirt may be removed from an automobile windshield as well as ice and snow.

In the accompanying drawings illustrating the invention:

Fig. 1 is a perspective view of my improved scraper, looking at the scraper side of the device, and illustrating the relationship of the handle and clasp;

Fig. 2 is a front plan view of the improved scraper, illustrating the clasp portion in dotted lines, and showing particularly the space on my device for a dealer's name and address, or advertising matter;

Fig. 3 is a side view of the improved scraper, illustrating the form of the handle and clasp and the outward bend or angle given to the scraper blade;

Fig. 4 is an illustration of the manner in which the improved scraper is placed on an automobile sun visor, illustrating the manner of clasping the device and its ready availability for use, and also illustrating the desirable eye-catching position of a dealer's address or advertising matter which may be placed on the windshield scraper;

Fig. 5 is a front plan view, looking at the scraper side, of a modification of my device, on which there is also provided a squeegee for wiping or cleaning the windshield;

Fig. 6 is a side view of the same modification of my device, partially in section, and taken along the line 6—6 of Fig. 7; and Fig. 7 is a rear plan view, looking at the squeegee side of the same modification of the device.

Both modifications of my device, with the exception of the squeegee itself, may be made from any material which is springy in character so as to provide a clasp for holding the device on an automobile sun visor as shown in Fig. 4. However, I prefer to make the device of a springy plastic material because it can be manufactured at less cost than of metal, it can be made in an assortment of attractive colors, will not rust, and will be sufficiently durable for the desired purpose. Since the device is intended to be given away or sold for a very small price, it is not essential that it be so constructed as to have a useful life of more than a few months, say through a winter season, although it may, of course, be made more durable. For example, the scraper may be made of stainless steel or other metal, so as to be practically indestructible.

The form of the device which does not include a squeegee is very simple in construction. A T-shaped strip is cut, cast, or stamped out of the desired material. The top or blade portion 10 of the T is generally rectangular and preferably about two and one-half to three inches wide and approximately one to one and one-half inches high. I have found that a wider blade is difficult to use when the snow or ice on the windshield is very heavy, and a narrower blade requires too many strokes to clean a windshield.

The head of the T is preferably rounded gradually into the projecting tail or handle portion 14 of the T, particularly when plastic is used, as I have found that such construction results in appreciably fewer fractures or cracking of the material than does a square cut juncture at that point. The tail 14 of the device is preferably just slightly less than twice as long as the blade portion 10 is wide, although it can function as desired when it is either longer or shorter. The tail 14 is preferably about an inch wide and may be of uniform width throughout its length. The tail 14 is folded over on itself at about its central point longitudinally so as to form a loop or bight 16 at its upper end, at which point the strips 18 and 20 are sufficiently spaced apart that one may insert his index or middle finger readily in the space between the strips. The sides 18 and 20 are so bent that they gradually decrease the distance between them until they contact or nearly contact each other at a point 22 about one-half to three fourths of an inch above the free end of the strip 20, preferably slightly above the blade portion 10. The blade portion 10 of the T and the free end 24 of the strip 20 diverge, commencing at about the point 22. While the degree of bend given to these portions may vary widely and still obtain satisfactory results, I have found that it is desirable if they are so formed that an extension of the free end 24 to the point a, as shown by the dotted line in Fig. 3, would cause the distance between the point a and the edge 26 to be about equal to the maximum width of the loop or bight 16. The resultant inclination of the blade 10 relative to the handle 14 makes it convenient to hold the device when using it. The free end 24 should be spaced sufficiently from the blade 10 that it will admit readily the edge 28 of an automobile sun visor 30.

When the device is constructed as above described, there should be a springiness in the loop 16 which will compress the strips 18 and 20 toward each other at the contact point 22 so as to grip firmly a support, such as a sun visor, so that the scraper will not be shaken loose by reason of the vibrations and shocks occurring in the travel of an automobile.

The edge 26 of the blade 10 should be formed or sharpened substantially to a knife edge throughout its width.

The blade portion, it will be observed, presents a very desirable advertising surface for printing, or to which may be affixed a label or decalcomania transfer giving the name, address, and telephone number, or other advertising matter, of a merchant, service station, or other place of business. When the scraper is clipped to a sun visor as shown in Fig. 4, such a business card or advertisement will always be within the sight of the driver and other occupants of the automobile, and it therefore has an advertising power of considerable value.

Referring now to the use of my device as a scraper, it will be observed that I have provided means for fastening it in a readily accessible position, and have provided, by the strips 18 and 20, a convenient handle for removing from or restoring the device to that position.

In using the device to scrape snow or ice from an automobile windshield, it is most convenient and efficient to insert the index or middle finger in the loop 16 and to apply the device to the windshield so that the knife edge 26 and the strip 18 at a point near the bight 16 contacts the windshield. The blade 10 is then at an angle at which it works effectively. Due to the resiliency of the handle part 18, the blade will cleave and pry off large sections of thick ice from the windshield. The strip 18, where it contacts the ice or glass, acts not only to position the blade 26 properly, but also in its movement breaks up and removes ice and snow from the windshield.

In the form of the invention shown in Figs. 5, 6, and 7, the scraper blade, handle, and clasp are substantially identical with the first form which I have described, and similar reference characters have therefore been applied to the corresponding parts. However, in this latter form, the clasp part 20 of the device is extended and widened to form another face 34 of substantially the same shape and dimensions as the blade 10. The face 34 is slightly narrower, however, than the blade 10, and does not extend quite so far from the contact point 22, as is illustrated in Fig. 6, being about three-eighths of an inch shorter in this dimension than the blade 10. Several prongs or lugs 36 are then struck out of the face 34. The prongs 36 are bent substantially at right angles as shown at 38 and 40 in Fig. 6. Between the prongs 36 and the projecting edge portions 42 of the face 34, is inserted a strip of rubber or synthetic rubber extending the entire width of the face 34.

The free ends of prongs 36 may then be bent inwardly toward the face 34, thus tightly engaging and holding the rubber strip 44 in place. The strip 44 extends beyond the free end of the face 34 a short distance, approximately three-eighths of an inch, to serve as a useful and efficient squeegee with which water, rain, or soft snow may be quickly removed from an automobile windshield or window.

It will be observed that the strip 44 can readily be reversed or renewed, only a slight lifting of the prongs 36 being required to permit such adjustment or replacement.

While I have shown and described preferred embodiments of my invention, it will be apparent that numerous variations and modifications thereof may be made without departing from the underlying principles of the invention. I therefore desire, by the following claim, to include within the scope of the invention all such variations and modifications by which substantially the results of my invention may be obtained through the use of substantially the same or equivalent means.

I claim:

A scraper formed of a flat piece of material bent upon itself to form a loop having two free-ended leg portions of approximately the same length, the inner surface of said leg portions contacting adjacent the free ends thereof, the free ends of said leg portions being arcuated away from each other from the point of contact to space the free ends apart, and a transversely extended portion formed on each side edge of the outer end of one of said free-ended leg portions and forming with the outer transverse edge of said one free-ended leg portion an elongated transverse edge.

JOSEPH ROJAKOVICK.

REFERENCES CITED

The following references are of record in the file of this patent:

UNITED STATES PATENTS

| Number | Name | Date |
| --- | --- | --- |
| 285,771 | Turner | Sept. 25, 1883 |
| 592,538 | Cole | Oct. 26, 1897 |
| 896,394 | Kindred | Aug. 18, 1908 |
| 1,261,844 | Orr | Apr. 9, 1918 |
| 2,280,778 | Andersen | Apr. 28, 1942 |

FOREIGN PATENTS

| Number | Country | Date |
| --- | --- | --- |
| 640,329 | France | Aug. 31, 1927 |
| 533,881 | Germany | Sept. 24, 1931 |